Patented June 8, 1937

2,083,182

UNITED STATES PATENT OFFICE 2,083,182

COMPOSITION OF MATTER FOR DYEING ANIMAL FIBERS

Henri Zweifel, Binningen, near Basel, and Charles Graenacher, Fritz Grether, and Fritz Straub, Basel, Switzerland, assignors to Society of Chemical Industry in Basle, Basel, Switzerland No Drawing. Original application July 16, 1934, Serial No. 735,538. Divided and this application May 17, 1935, Serial No. 22,110. In Switzerland August 12, 1933

4 Claims. (Cl. 8—6)

This application is a division of our application for patent Serial No. 735,538 filed in the United States on July 16, 1934, and in Switzerland on August 12, 1933.

There is known a series of lyophile unsulfonated dispersing agents characterized on the one hand by containing in the same cation at least one basic nitrogen atom and at least one aliphatic radical consisting of at least 8 carbon atoms, the term aliphatic radical comprising both open and cyclic chains, such as inter alia decyl, dodecyl, heptadecyl radicals, or the radicals which correspond to the naphthene hydrocarbons, and on the other hand by their tendency to combine with dyestuffs containing sulfo-groups.

Such products are, for example, the trimethyl-ammonium-sulfomethylate of mono-stearoyl-para-phenylenediamine of the formula

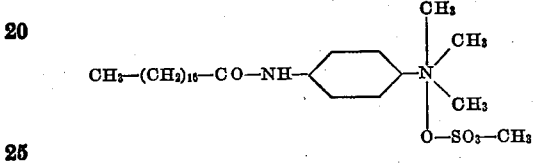

(cf. German Patent No. 559,500, Example 10), the trimethylammoniumsulfomethylate of mono-oleoyl-ethylenediamine of the formula

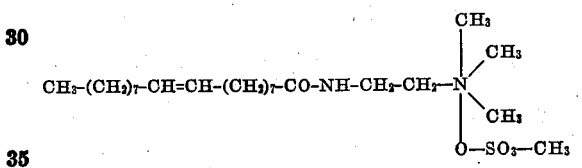

the trimethylammoniumsulfomethylate of mono-stearoylethylenediamine, the hydrochloride of diethylcetylamine of the formula

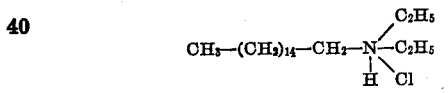

(cf. Reychler, "Chemisches Zentralblatt" published by the Deutsche Chemische Gesellschaft, 1913, II, page 1377, line 2),
the dimethyloctodecylamine-hydrochloride of the formula

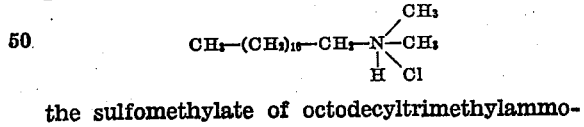

the sulfomethylate of octodecyltrimethylammonium, the hydrochloride of pentadecyldihydroimidazole of the formula

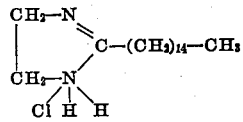

the cetylpyridinium chloride or bromide; further the unsulfonated cyclic amidines which are obtained by mono- or di-alkylating or di-benzylating or also by benzylating and alkylating such benzimidazoles whose μ-substituent consists of a chain of at least 7 carbon atoms. Such products are for example the μ-heptadecyl-N-ethyl-benzimidazole hydrochloride of the formula

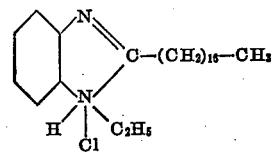

the μ-heptadecenyl-N:N-dibenzylbenzimidazoliumchloride of the formula

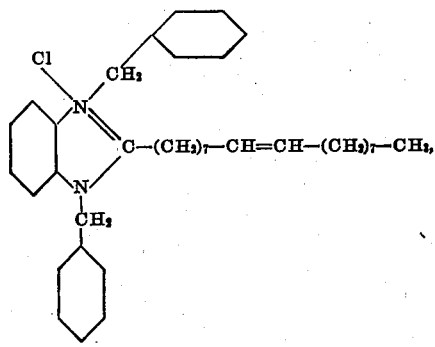

the μ-heptadecyl-N-hydroxyethyl-benzimidazole hydrochloride etc. Such products are also compounds in which the nitrogenous and the aliphatic radicals containing at least 8 carbon atoms are linked with each other in the manner of an ester or an ether. Such products are for instance, the mixed ether of cetyl-alcohol and N-hydroxymethylpyridinium chloride, the hydrochloride of the ester from stearic acid and dimethyl- or diethylaminoethanol of the formula

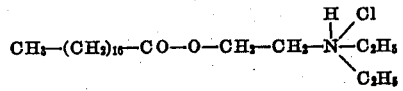

the stearyl choline-chloride and the corresponding benzyl compound of the formula

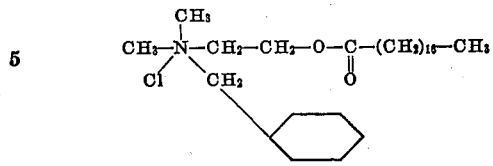

the palmitic acid ester of 1-hydroxy-phenyl-3-trimethylammonium chloride of the formula

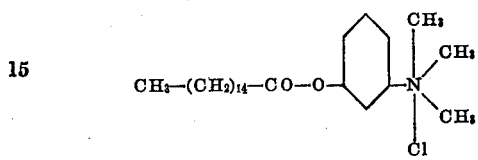

the stearic acid ester of hydroxyethylpyridinium chloride of the formula

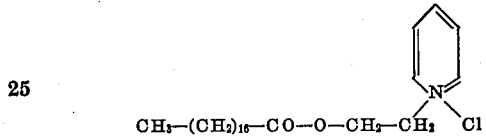

the hydrochloride of diethylaminoethyloctodecylcarbonate, the stearic acid ester of the addition product of glycerine-mono-chlorhydrin to pyridine of the formula

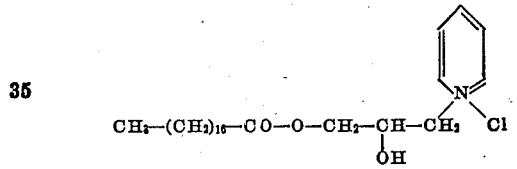

or of α.α'-glycerinedichlorhydrin and pyridine or the like.

In all these compounds the stearic acid radical and the palmitic acid radical may be exchanged for other acid radicals, for instance that of oleic acid, capric acid, lauric acid, myristic acid or ricinoleic acid. Furthermore, the alcoholic radical, such as that of cetyl alcohol, may be replaced by the radical of the alcohol corresponding with one or other of the aforesaid acids, such as the oleyl alcohol. Finally, derivatives of complex amines may be used, such as derivatives of diethylene-triamine, triethylene-tetramine or the like. All these products neither contain sulfogroups nor carboxyl-groups; but in the form of the salts which they form with acids, due to the presence of the basic N-atom, they are lyophile. If they are quaternary ammonium compounds, they may be lyophile also in the form of the free bases.

These products are valuable assistants for dyeing those dyestuffs which are being dyed in the presence of acetic acid. However, if these dispersing agents are used in such proportion as is usual for textile assistants, that is to say in proportion of 1–10 per cent. of the goods to be dyed, there are obtained useless, and in many cases, directly injurious results. If they are used in essentially smaller proportions than has hitherto been usual with such assistants they improve the affinity of the dyestuff in that there are obtained, for example, more vivid or fuller tints than without the assistant. The invention is particularly applicable in dyeing wool and silk, and valuable, even surprising, effects may be obtained with very different dyestuffs. By their use the fastness to light of the dyeings produced, particularly when using azo-dyestuffs, is also very often considerably improved.

The dyeing with the assistants coming into consideration here consists in adding to the dyebath a small proportion, i. e. less than 1 per cent. calculated on the weight of the fibre to be dyed, of one of the aforesaid dispersing agents. As a rule quantities of 0.1 to 0.2 per cent. will suffice. With certain dispersing agents or with certain dyestuffs it may also be of advantage to use more of the dispersing agent, for example 0.5 to 0.9 per cent.

The present invention now relates to the production of new compositions of matter which are particularly valuable in the dyeing processes of the dyestuffs which are being dyed in the presence of acetic acid. The method of producing the new compositions of matter consists in mixing a small proportion of one of the lyophile dispersing agents in question with the dyestuffs characterized above which are dyed advantageously in the presence of small quantities of such dispersing agents. The dyestuff preparation thus obtained, when used in an acid dye-bath, yields the same effects as the dye-bath does when the assistant has been added to it.

The dyestuffs which are being dyed in the presence of acetic acid comprise the dyestuffs which may be dyed in an acetic acid bath as well as dyestuffs in the dyeing of which the acetic acid is used in the form of ammonium acetate which, as is known, splits off acetic acid in hot dye-baths due to the hydrolysis (cf. the dyeing of dyestuffs of the type of the dyestuff No. 552 of Schultz, Farbstofftabellen, 7th edition, 1931), and the dyestuffs which are first dyed in an acetic acid bath and to which sulfuric acid is added in the course or at the end of the dyeing process, as is the case for example in the dyestuff No. 300 of the said Farbstofftabellen. Such dyestuffs are for example those known to dye in an acetic acid bath which belong to the groups of dyestuffs numbered as follows in Schultz, Farbstofftabellen, 7th edition, 1931, namely:— 120, 123, 247, 248, 298, 299, 300, 303, 552, 578, 588, 590, 591, 592, 594, 599, 600, etc.; also the more recent dyestuffs dyeing in an acid bath, such as those described in the following German specifications Nos. 270,831; 261,047; 286,091; 325,062; 398,792; 329,651 and French specification No. 479,998. The effects obtained are independent of the constitution of the dyestuff. Valuable results are also obtained with dyestuffs of the azine, triphenylmethane and anthraquinone series.

The following examples illustrate the invention, the parts being by weight:—

*Example 1*

100 parts of a finely powdered Standard Black, consisting of the black diazo-dyestuff obtainable by coupling in acid medium and then in alkaline medium 1 mol of 4-nitrodiazobenzene and 1 mol of diazobenzene with 1 mol of 1-amino-8-hydroxynaphthalene-3:6-disulfonic acid, of the Orange dyestuff No. 189, Schultz, Farbstofftabellen 1931, 7th edition, and of the Red dyestuff No. 120, of the same Farbstofftabellen, are stirred in a convenient mixing vessel heated to 100° C., and at the same time there is caused to flow gradually or there is sprayed into the vessel 20 parts of an alcoholic solution of 10 per cent. strength of the mixture of the hydrochlorides of N-dihydroxy-propylbenzimidazoles, which is obtainable by treating with gylcerine chlorhydrine the benzimidazole mixture highly alkylated at the μ-carbon atom, which is itself produced by heating ortho-phenylene-diamine with hydrogenated fish oil.

There is obtained a dry dyestuff powder which dyes wool a strikingly fuller and deeper shade than is obtainable with the dyestuff which has not been treated in the foregoing manner.

Example 2

100 parts of finely powdered azo-dyestuff from diazotized 1-amino-8-hydroxynaphthalene-3:6-disulfonic acid and 1-phenyl-aminonaphthalene-8-sulfonic acid are made into a paste, in a suitable mixing vessel capable of being heated, with 50 parts of alcohol; the paste is mixed with 15 parts of an alcoholic solution containing 4 per cent. of phosphoric acid and 10 per cent. of the mixture of the hydrochlorides of the N-dihydroxypropylbenzimidazoles, which is obtained by treating with glycerine chlorhydrine the mixture of benzimidazoles highly alkylated at the μ-carbon atom, which is produced by heating orthophenylenediamine with a mixture of fats from hydrogenated fish oil, coconut oil and olive oil, it being therefore a question of a mixture consisting chiefly of the following three benzimidazoles:—

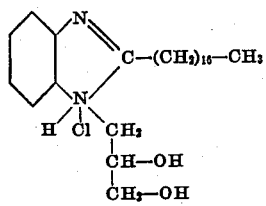

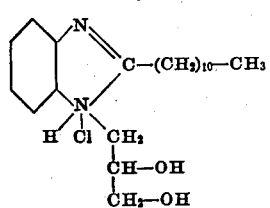

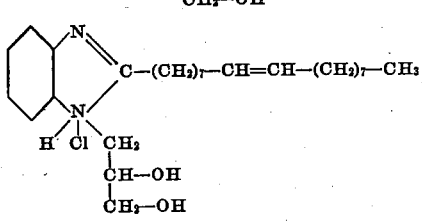

The whole is then dried, while stirring, and powdered. The product is a dry dyestuff powder, which is not sticky, its dyeings on wool have a strikingly fuller and deeper shade than is produced by the parent dyestuff which has not been treated.

The procedure is similar with the other dyestuffs which are being dyed in the presence of acetic acid, such as the dyestuff obtainable by coupling diazotized α-naphthylamine with 1-hydroxynaphthalene-3:6-disulfonic acid, the dyestuff obtainable by condensing 1 mol. benzaldehyde with 2 mols ethylbenzylaniline, sulfonating the condensation product, oxidizing the leucobody and causing the latter to react with paraphenetidine, the symmetrical 1:4-di-(4'-4''-dimethyl)-phenyl-aminoanthraquinone, and the 2:7-disulfonic acid of the 3:6-diphenylnaphthophenonesafranine.

The compositions of matter of the preceding examples may vary with regard to their content of lyophile dispersing agent. As a rule it is advisable to use less than 10 per cent. of the weight of the dyestuff of the lyophile dispersing agent. Amounts which do not exceed 5 per cent. have proved particularly successful, as for example 5 per cent., 4 per cent., 3 per cent., 2 per cent., or 1 per cent. The amounts depend on the nature of the dyestuff.

What we claim is:—

1. A composition of matter, characterized by a content of an acid wool dyestuff which is dyed in presence of acetic acid, and of at the most 5 per cent. of the weight of the dyestuff of a lyophile dispersing agent consisting of a lyophile salt of a benzimidazole substituted at the μ-carbon atom by an open aliphatic chain consisting of at least 8 carbon atoms.

2. A composition of matter, characterized by a content of an acid wool dyestuff which is dyed in presence of acetic acid, and of at the most 5 per cent. of the weight of the dyestuff of a lyophile dispersing agent consisting of a lyophile salt of a benzimidazole substituted at the μ-carbon atom by an open aliphatic chain consisting of at least 8 carbon atoms.

3. A composition of matter, characterized by a content of an acid azo-dyestuff for wool which is dyed in presence of acetic acid, and of at the most 5 per cent. of the weight of the dyestuff of a lyophile dispersing agent, consisting of a lyophile salt of an N-alkylated benzimidazole substituted at the μ-carbon atom by an open aliphatic chain consisting of at least 8 carbon atoms.

4. A composition of matter, characterized by a content of an acid azo-dyestuff for wool which is dyed in presence of acetic acid, and of at the most 5 per cent. of the weight of the dyestuff of a lyophile dispersing agent, consisting of a lyophile salt of an N-alkylated benzimidazole substituted at the μ-carbon atom by an open aliphatic chain consisting of at least 8 carbon atoms.

HENRI ZWEIFEL.
CHARLES GRAENACHER.
FRITZ GRETHER.
FRITZ STRAUB.